Feb. 16, 1960 A. P. LANG 2,925,281

RECORDING APPARATUS

Filed Feb. 4, 1954 5 Sheets-Sheet 1

INVENTOR
Albert P. Lang
Synnestvedt & Lechner
ATTORNEYS

INVENTOR
Albert P. Lang
Synnestvedt + Lechner
ATTORNEYS

Feb. 16, 1960 A. P. LANG 2,925,281

RECORDING APPARATUS

Filed Feb. 4, 1954 5 Sheets-Sheet 3

INVENTOR
Albert P. Lang
Synnestvedt & Lechner
ATTORNEYS

INVENTOR
Albert P. Lang
Synnestvedt & Lechner
ATTORNEYS

RECORDING APPARATUS

Filed Feb. 4, 1954 5 Sheets-Sheet 5

INVENTOR
Albert P. Lang
Synnestvedt + Lechner
ATTORNEYS

United States Patent Office 2,925,281

Patented Feb. 16, 1960

2,925,281

RECORDING APPARATUS

Albert P. Lang, Philadelphia, Pa., assignor, by mesne assignments, to Armour Research Foundation of Illinois Institute of Technology, Chicago, Ill., a corporation of Illinois Application February 4, 1954, Serial No. 408,197

11 Claims. (Cl. 274—17)

This invention relates to magnetic recording and generally has to do with magnetic recording apparatus of the kind in which magnetic sheet records are scanned while wrapped around a revolvable support.

Such apparatus is well suited for office dictation purposes; and the invention is here illustrated and described as embodied in an improved office dictation machine.

The machine in question is of the general kind disclosed in U.S. patent to Bruce Roberts No. 2,653,819 and in application Serial No. 11,993 filed February 28, 1948, both of which are assigned to the assignee of the present application.

Dictating machines of the kind disclosed in the above mentioned patent and application include a rotatable mandrel for supporting a removable record sheet, a carriage movable axially of the mandrel, recording-reproducing and erasing means mounted on the carriage and adapted to scan a track on a record carried by the record support, mechanism for rotating the support, mechanism for propelling the carriage both in a normal scanning sense and in a back-spacing sense, an amplifier, an external transducer or transducers and controls for the scanning mechanism and for the amplifier.

It is a general object of the present invention to improve and simplify the control and operating characteristics of office dictating machines.

Another object of the invention is to provide machines of the character described with improved facility for sheet record loading and unloading.

A further object of the invention is to provide for simplified loading, mounting, and stripping of a record sheet.

Still further the invention contemplates improvements in the drive mechanism of the machine and in the control thereof.

The invention also contemplates an improved and simplified system for controlling back spacing and condition switching.

How the foregoing and other objects of the invention are attained will be understood more clearly upon reference to the description which follows and from the drawings, in which—

It will be understood that the machine is illustrated with the cover removed.

Figure 2:
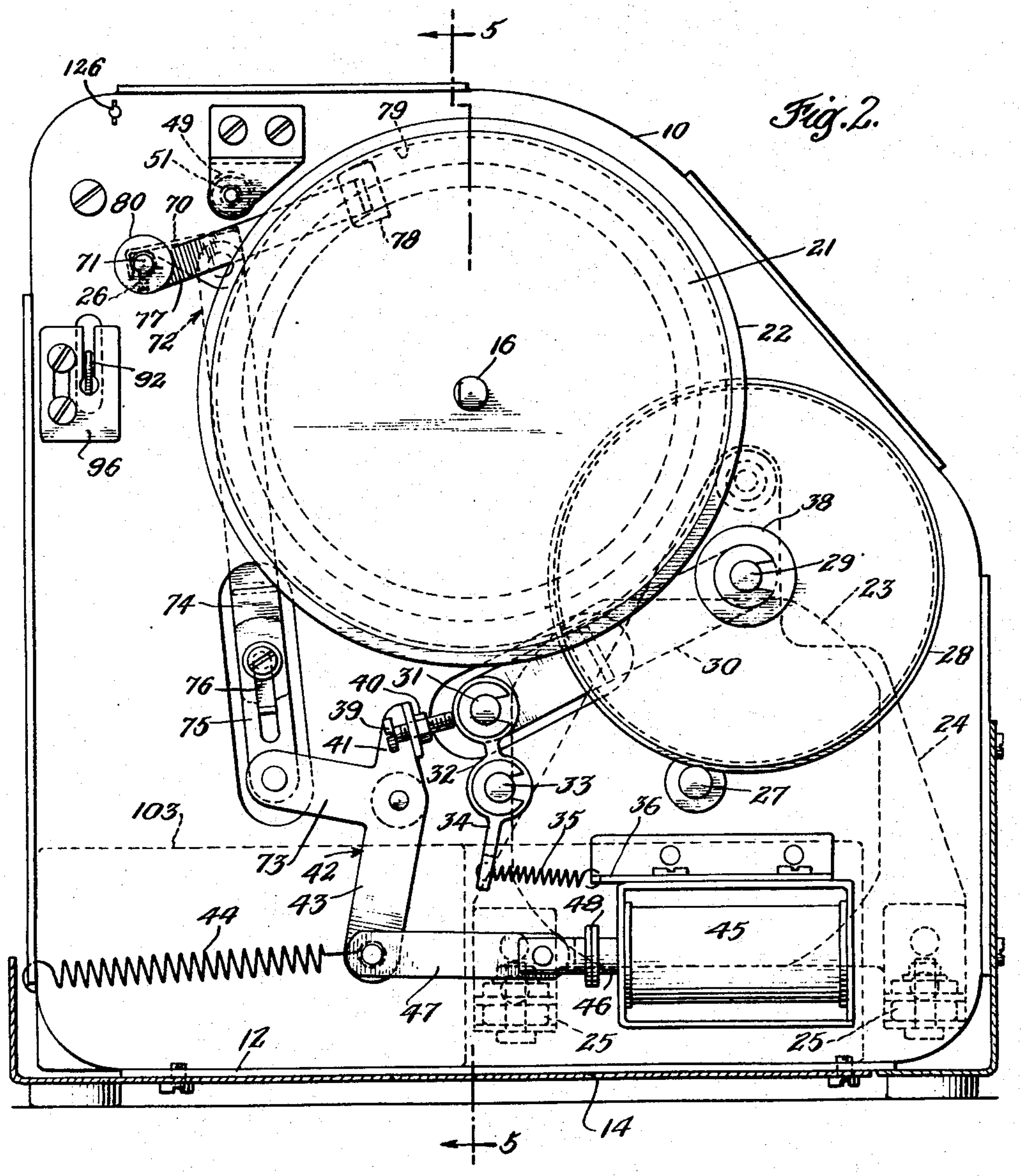
Figure 2 is an end view of the machine of Figure 1 looking toward the right.
Figure 6:
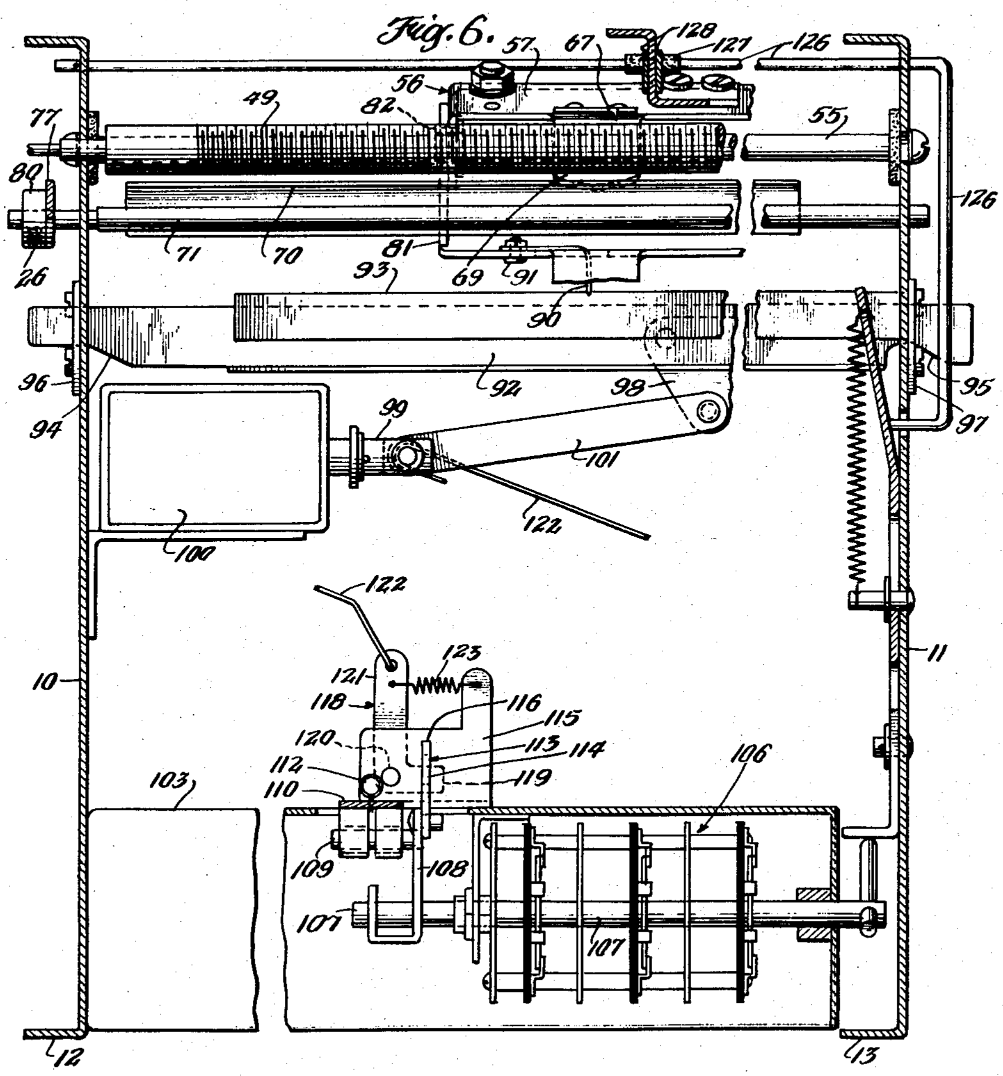
Figure 6 is a sectional elevation on the line 6—6 of Figure 3.
Figure 7:
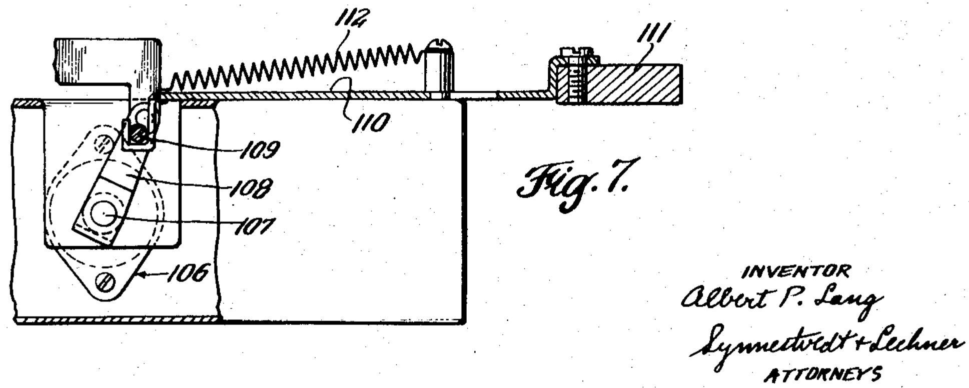
Figure 7 is a fragmentary cross section on the line 7—7 of Figure 1.

The major parts of the machine are supported by or between a pair of end plates 10 and 11, which are flanged at the bottom as at 12—13 of Figure 6, and secured to the bottom plate 14 as shown in Figure 2.

Figure 1:
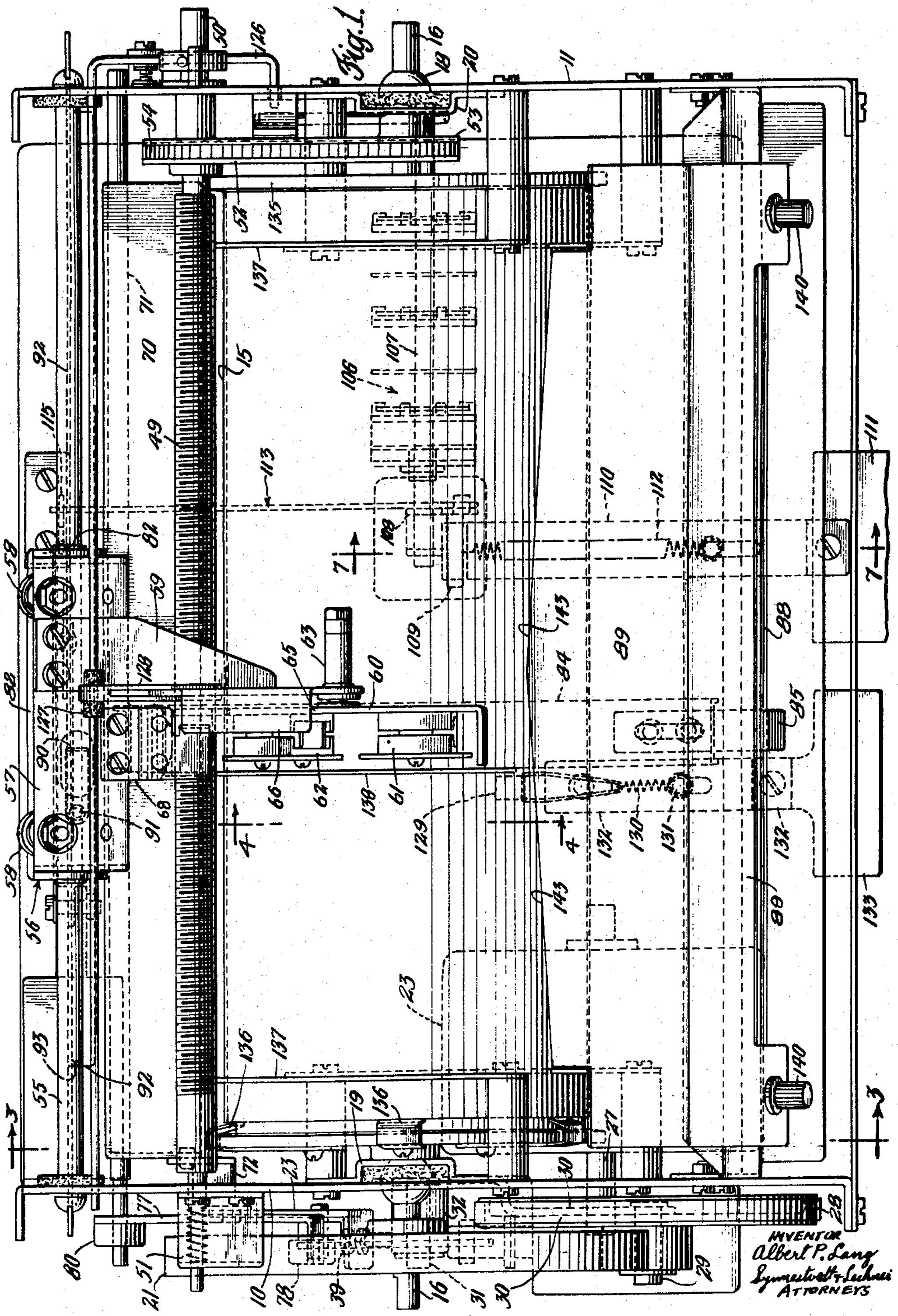
Figure 1 is a plan view of the dictating machine of the invention.

Turning now to Figure 1, a cylindrical record carrier generally indicated at 15 is mounted on a shaft 16, which shaft is journalled in bearings 17 and 18, which are secured to end plates 10 and 11 by brackets 19 and 20 respectively. Shaft 16 also carries a driven wheel 21 which is provided with a tire of rubber or similar material 22.

As may best be seen in Figure 2, the carrier 15 is driven by a motor 23 provided with a mounting 24, which mounting is secured to end plate 10 by shock mountings generally indicated at 25. Motor shaft 27 extends through end plate 10, where it is engaged by a shiftable intermediate rubber-tired drive element or puck 28. Puck 28 is secured by a pin 29 to movable link 30, the other end of which is pivotally secured by a pin 31 to a crank generally indicated at 32, which is pivotally secured by a pin 33 to end plate 10. The lower arm 34 of crank 32 is biased toward the front of the machine by a spring 35, which interconnects arm 34 with a bracket 36 secured to end plate 10. It will be seen therefore, that the spring 35 tends to draw link 30 toward the rear, carrying with it puck 28, until the shouldered portion 38 of puck 28 engages tire 22 of driven wheel 21.

However, rearward motion of link 30 is stopped short of engagement between shoulder 38 and wheel 21 by an adjustable stop screw 39 threaded in a nut 40, carried by arm 41 of a second crank generally indicated at 42. The lower arm 43 of crank 42 is biased toward the rear of the machine by a spring 44 with the result that stop screw 39 opposes rearward movement of link 30 and holds drive puck 28 out of engagement with driven wheel 21, so long as crank 42 is in its maximum clockwise position responsive to the action of biasing spring 44.

Crank 42 is adapted to be oscillated in the counterclockwise direction by solenoid 45 having an armature 46 connected to arm 43 of crank 42 by a link 47. Armature 46 is provided with a fibre washer 48 which serves to limit movement of armature 46 into solenoid 45 on energization thereof and to thereby limit counter-clockwise movement of crank 42.

Stop 48 is so located that stop screw 39 is entirely clear of the upper arm of crank 32 when the solenoid is energized and shoulder 38 of puck 28 is fully engaged with driven wheel 21 responsive to the bias imposed by spring 35 of crank 32.

It will be seen, therefore, that record carrier 15 may be selectively started and stopped by energizing and deenergizing solenoid 45. The energization of solenoid 45 is controlled by a start-stop switch, not shown, which may conveniently be located on the hand microphone used by a dictating operator or on a foot switch used either by a dictating operator or a transcribing operator.

Lead screw 49 is rotatably supported between end plates 10 and 11 by an adjustable mounting 50 at the right hand end and a spring held mounting 51 at the left hand end to provide for slight adjustment of the axial position of lead screw 49 relative to record carrier 15. Lead screw 49 is driven by a chain 52 which engages a sprocket 53 on record carrier shaft 16 and a sprocket 54 secured to lead screw 49. Accordingly, the lead screw 49 rotates whenever the drive to record support 15 is established.

A rod 55 extending between end plates 10 and 11 parallel to the axes of carrier 15 and lead screw 49 provides a carriage way for a carriage generally indicated at 56. Carriage 56 comprises an upper portion 57 on which are journalled two opposed pairs of rollers 58.

Rollers 58 are grooved and engage opposite sides of rod 55 and provide for free traversing movement of the carriage 56 along rod 55 and also permit oscillation of the upper portion 57 of the carriage about the axis of rod 55. Mounted on upper portion 57 of the carriage 56 is an arm 59 to which is pivotally secured an equalizer 60 carrying at its forward end an erasing head 61 and at its rearward end a recording-reproducing head 62. Equalizer 60 is pivotally mounted on arm 59 by a pivot pin 63 and is biased in the counter-clockwise direction by a spring 64, oscillation in that direction responsive to the bias of spring 64 being limited by engagement of an abutment 65 formed on equalizer 60 against a flange 66 formed on arm 59. Since the entire head assembly is well forward on rod 55, the point about which upper carriage member 57 oscillates, the head assembly is urged toward record carrier 15 by gravity. As will be seen from Figure 3, if the head assembly is allowed to fall toward the carriage, recording-reproducing head 62 will first engage a record on the support and the weight of the carriage assembly will then cause equalizer 60 to oscillate about pin 63 against the bias of spring 64 until erasing head 61 also engages a record on the carriage.

Figures 3, 4:
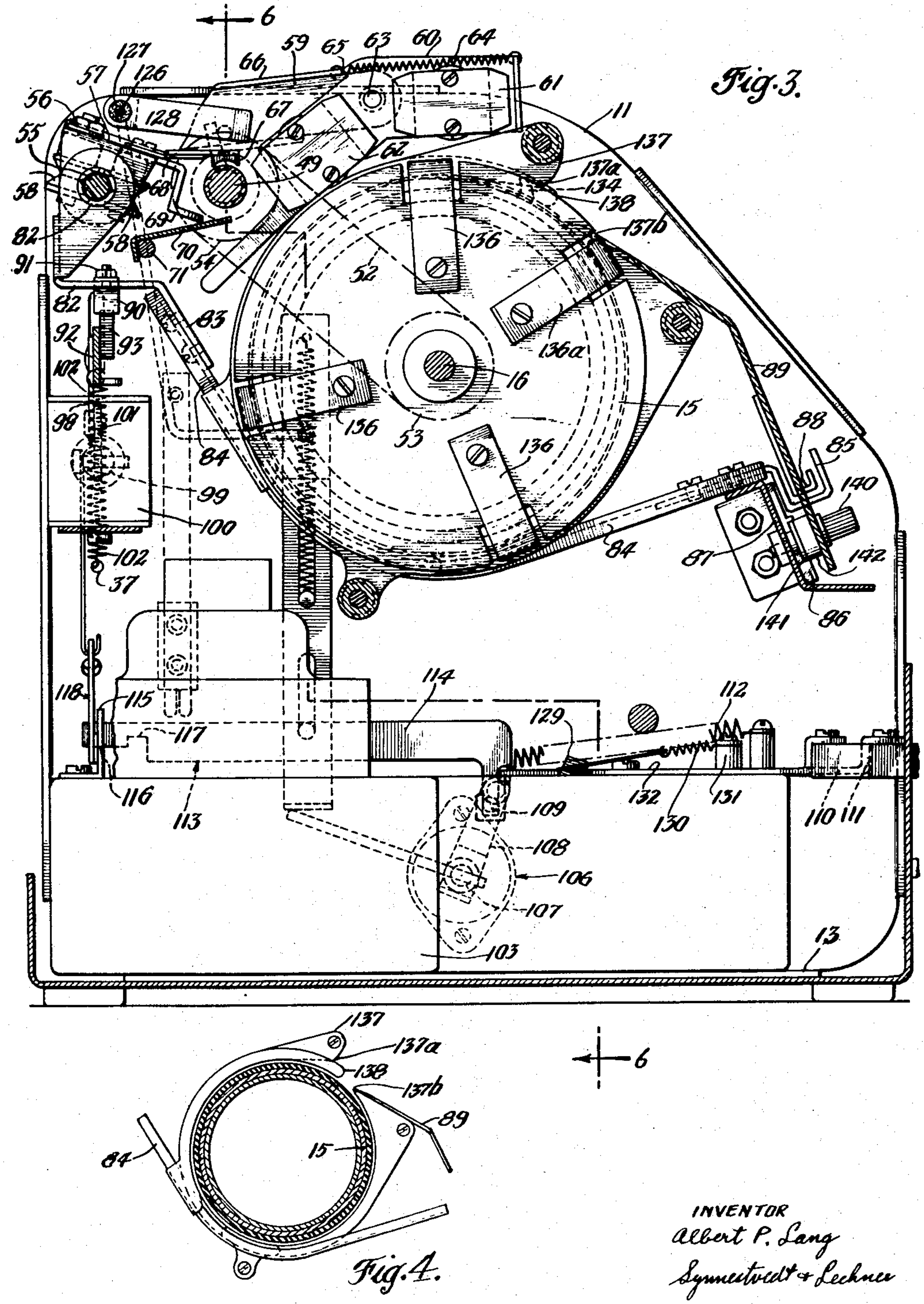
Figure 3 is a sectional view on the line 3—3 of Figure 1.
Figure 4 is a fragmentary sectional view, on a reduced scale, taken on the line 4—4 of Figure 1.

Upper carriage part 57 also carries a half nut 67, the nut 67 being secured to carriage member 57 by a spring metal strip 68 in a position such that it engages lead screw 49 when the heads engage a record on the carrier but clears the threads of lead screw 49 when the heads are retracted as shown in Figure 3.

The upper carriage member 57 is also provided with a foot 69 which extends forwardly and downwardly and which cooperates with a tilt bar 70 to provide for oscillation of upper carriage member 57 about the axis of rod 55. Tilt bar 70 is mounted on a rod 71, which in turn is journalled in end plates 10 and 11, and is so disposed relative to foot 69 that when it is oscillated in a counter-clockwise sense, it engages foot 69 and urges upper carriage member 57 in a counter-clockwise sense. Stated otherwise, when tilt bar 70 has been oscillated to its upper position, it prevents heads 61 and 62 from engaging a record on the carrier and prevents inter-engagement between nut 67 and lead screw 49 responsive to the gravity bias above mentioned. However, when tilt bar 70 is tilted to its lower position, the heads are free to engage the record and the nut is free to engage the lead screw.

Tilt bar 70 is controlled by the linkage already discussed in connection with the drive control mechanism illustrated in Figure 2. Thus, it will be seen that tilt bar 70 is connected by a link 72 to arm 73 of crank 42. It will also be noted that link 72 is made in two parts, an upper part 74 and a lower part 75, the two being adjustably connected by a screw-and-slot arrangement generally indicated at 76. A crank arm 77 is adjustably secured to rod 71 by a bushing 80 and set screw 26. Crank 77 carries a brake shoe 78 positioned inside driven wheel 21 and is adapted to engage an inner surface of the flange 79 of wheel 21 when arm 77 is rocked in a counter-clockwise direction. It should also be noted at this time that the engagement between brake shoe 78 and flange 79 establishes the counter-clockwise limit of movement of rod 71 and tilt bar 70 and also establishes a limit for the entire system comprising link 72, crank 42, link 47 and solenoid armature 46.

Thus, according to the invention, when the solenoid is not energized, spring 44 pulls lower arm 43 of crank 42 to the rear, thus causing upward movement of crank arm 43, link 72, crank arm 77 and brake shoe 78. This movement is limited by engagement of brake shoe 78 with flange 79 of wheel 21. As a consequence, the full force of spring 44 is available to energize the brake.

The position of tilt bar 70 relative to rod 71 is such that in this position of rod 71 (the position rod 71 occupies when the brake is fully engaged), upper carriage portion 57 is oscillated counter-clockwise by a distance sufficient to raise heads 61 and 62 clear of the record and to raise nut 67 clear of lead screw 49.

It should also be noted that in this same position (i.e., with brake shoe 78 fully engaged) stop screw 39 on arm 41 of crank 42 is carried far enough in a clockwise direction to prevent engagement between the shoulder portion 38 of intermediate wheel 28 and driven wheel 21.

When solenoid 45 is energized, on the other hand, armature 48 moves to the right as viewed in Figure 2 until stop 48 strikes the solenoid housing. In this position, stop screw 39 has shifted counter-clockwise sufficiently far to permit engagement between shoulder 38 of intermediate wheel 28 with driven wheel 21; brake shoe 78 has moved sufficiently far in a clockwise sense to clear flange 79; and tilt bar 70 has moved sufficiently far in a clockwise sense to clear foot 69 of carriage member 57, even though heads 61 and 62 are fully engaged with a record on the carrier and half nut 67 is fully engaged with lead screw 49.

It will thus be seen that in the condition just described, i.e., with solenoid 45 energized, stop 39 has been rendered ineffective so that the intermediate drive wheel is brought into engagement by its bias spring 35 and the tilt bar has been made ineffective to prevent engagement of the heads with a record and the nut with a lead screw responsive to the gravity bias on upper carriage member 57. On the other hand, the solenoid has overcome the bias provided by the spring 44 which would otherwise cause engagement of brake 78 with flange 79 of driven wheel 21.

It will be noted that as a consequence of this arrangement, the engagement of each element can be adjusted separately without effecting the adjustment of the others. Thus, engagement of intermediate wheel 28 is independently adjustable by means of stop screw 39. The relative positions of brake shoe 78 and tilt bar 70 can be adjusted by means of a set screw 26 on bushing 80 which secures crank 77 to rod 71. Engagement of tilt bar 70 can be adjusted by means of screw-and-slot arrangement 76.

Figure 5:
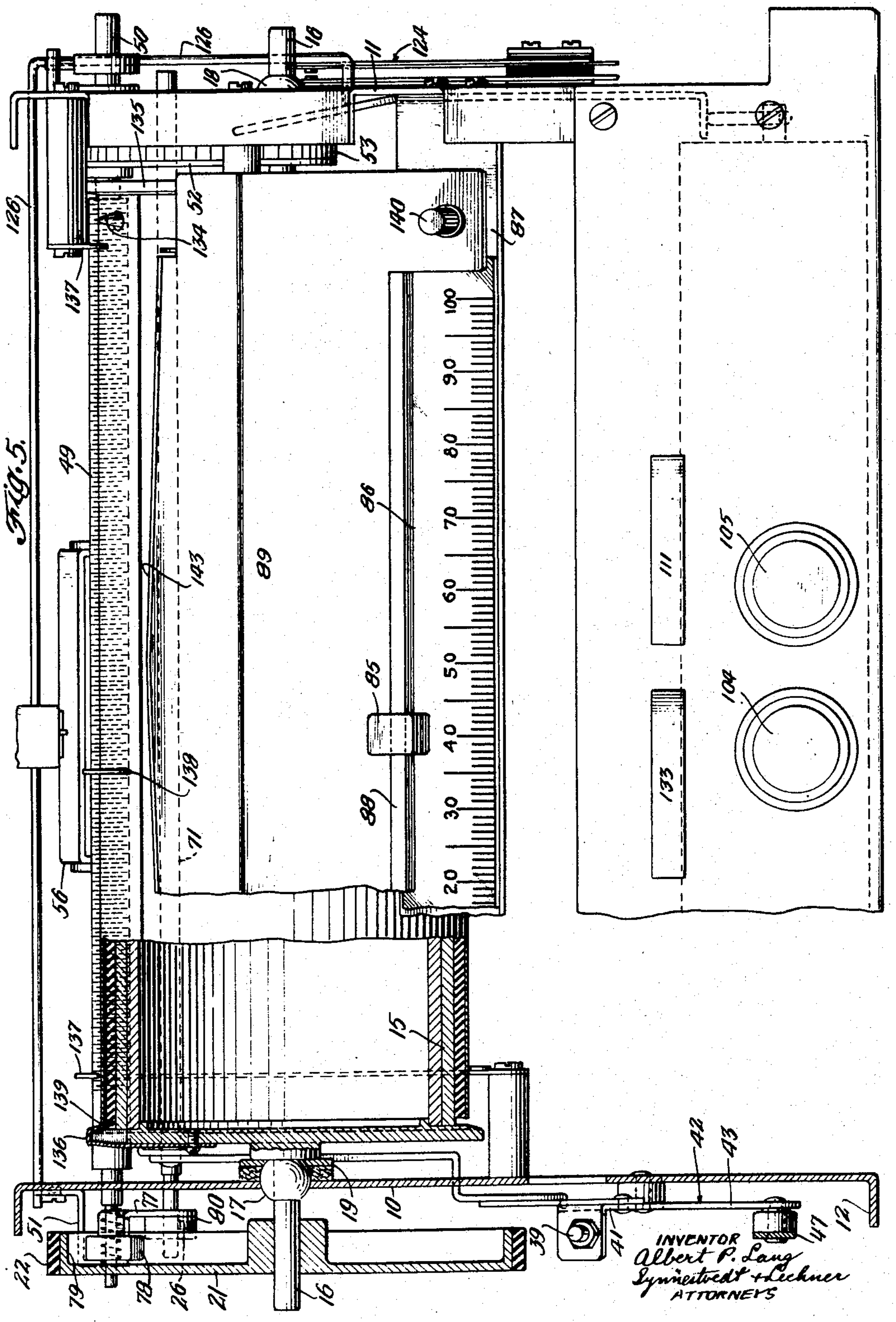
Figure 5 is a front elevational view of the machine partly in section on the line 5—5 of Figure 2.

The apparatus also includes mechanism for driving the carriage in a back spacing or reverse direction, i.e., from right to left as viewed in Figures 1, 5 and 6. Carriage 56 includes a lower member 81 which is secured to carriage member 57 by means of bushings 82, whose inner diameter is somewhat in excess of the outside diameter of rod 55. While this member 81 travels back and forth across the machine with carriage member 57, it is constrained against oscillation about rod 55 by a strap 83 which in turn is connected to a channeled member 84 which passes under and around carrier 15 to the front of the machine, where it supports a pointer 85, which cooperates with a scale 86 to indicate the position of the carriage axially of the record support. Oscillation of carriage member 81 in the clockwise direction is prevented by interengagement between channel member 84 and a member 87 which also serves to support scale 86. Counter-clockwise rotation is prevented by inter-engagement between the pointer 85 and flange 88 developed on the bottom edge of the central portion of stripper plate 89.

Carriage member 81 also carries with it a pawl 90 formed from a strip of spring material and secured to member 81 by bolt 91. Pawl 90 is positioned to be engaged by a rack 92 having on its upper surface a strip of rubber or similar material 93. As may best be seen in Figure 6, rack 92 is provided with a cam surface 94 at its left hand end and a cam surface 95 at its right hand end, which surfaces rest in apertures in wear plates 96 and 97 respectively, which are secured to end plates 10 and 11. A web 98, which is secured to rack 92, is interconnected with the armature 99 of back space solenoid 100 by a link 101. It will be seen that upon energization of solenoid 100 rack 92 will be drawn to the left as seen in Figure 6, as a consequence of which it will slide up on cam surfaces 94 and 95 into engagement with pawl 90; and, that, as it continues in its leftward movement, it will propel carriage 56 to the left for a short distance. Upon de-energization of solenoid 100, rack 92 will be restored to its rightward position by a spring 102 (see Figure 3). This spring extends at an angle of about 45° downwardly and to the right from the portion of rack 92 broken out in Figure 6 to a hole 37 in end plate 11 as shown in Figure 3.

The apparatus also includes electronic circuits including an amplifier and other elements used during recording and reproducing and which are enclosed in an electronic chassis generally indicated at 103. Among the elements included in chassis 103 are recording and reproducing volume controls 104 and 105, and a condition switch generally indicated at 106, which switch is adapted in one position to condition the apparatus for reproducing and in the other position to condition the apparatus for recording. Shaft 107 of switch 106 is adapted to be oscillated by a crank 108 to which is connected by means of a pin 109 a link 110 carrying a "Dictate" push button 111. The switch is urged toward reproduce position by a spring 112 but is adapted to be maintained in "Dictate" position by a latch mechanism generally indicated at 113 and including a link 114 and a vertical plate 115 having therein a vertical slot 116 through which the end of link 114 extends. A notch 117 in the lower surface of link 114 permits link 114 to drop when button 111 is pushed to the rear. When link 114 has dropped, interlocking between notch 117 and vertical plate 115 prevents forward motion of link 114 responsive to the bias of spring 112, thus holding switch 106 in the record or "Dictate" position. The latch 113 is released by a crank 118 having horizontal arm 119, which extends under link 114. Crank 118 is pivotally secured to vertical plate 115 by a pivot pin 120. It will be seen that a counter-clockwise torque applied to upper arm 121 of crank 118 will raise link 114 until the notch 117 clears plate 115, whereupon spring 112 will throw the switch 106 to the reproduce position and restore button 111 to its extended position. Such a torque is adapted to be applied to vertical arm 121 by a link 122 interconnecting arm 121 with the armature 99 of the back space solenoid 100. A small spring 123 restores crank 118 to inoperative position when the torque applied by solenoid 100 is removed.

From the foregoing description it will be seen that energization of back space solenoid 100 will not only cause back spacing of the carriage, but will also (assuming that the apparatus is in dictating condition) cause the apparatus to be switched to reproducing condition. Thus, it is impossible to back space the carriage while the apparatus is in dictating condition and inadvertently erase the material in advance of the new position of the carriage, although it is possible to erase such material deliberately merely by depressing button 111 to again switch the apparatus to recording condition.

The apparatus of this invention also includes the direction sensitive switch disclosed in co-pending application Serial No. 11,993, filed February 28, 1948, assigned to the assignee of the present invention. This switch, which may be seen at 124 in Figure 5 is actuated by a rod 126, which in turn is adapted to be driven by a fibrous bushing 127 carried by a double arm 128, which is driven by arm 59 of carriage 56. The switch is so arranged that upon any movement of the carriage in a back spacing direction whether effected manually or by the mechanism above described, the switch 124 closes, energizing solenoid 100 with the result that the apparatus is shifted to reproduce condition as above described.

A second switch—not shown—is mounted in the electronic chassis 103 and has an oscillatable operating member 129 (see Figure 3). This second switch is connected electrically in parallel with switch 124 and is biased to open position by a spring 130 which spring is connected at one end to member 129 and at the other to a post 131. Operating member 129 is adapted to be actuated to the closed position of the associated switch against the bias of spring 130 by a link 132 carrying at its forward end a "Listen" button 133. It will be seen, therefore, that each time button 133 is depressed, the carriage will be back spaced a distance determined by the geometry of the back spacing mechanism, and that in addition, if the apparatus is in recording condition, depressing button 133 will result in the actuation of switch 106 to reproduce condition.

The portions of the apparatus so far described provide for control of the drive to the record support and to the carriage, for control of back space, and for control of the electronic components of the machine to provide for switching from record to reproduce condition. Features of the apparatus having to do with the loading, mounting, and unloading of records are now to be discussed.

The machine of the invention is adapted to be used with rectangular record sheets carrying magnetizable particles as disclosed in the Roberts patent above mentioned. In particular, the machine employs recording sheets having a pair of apertures in adjacent corners which, in cooperation with a pair of pins 134, are adapted to establish and maintain the position of the leading edge of the sheet on record carrier 15. In machines of this kind, only the leading edge is secured to the record support, the trailing edge being wrapped around the support and preferably overlapping the leading edge by a short distance. The corners of the trailing edge are cut out to clear the pins 134.

To load the sheet into the machine, a record sheet with its coated surface upward and with the edge having the apertures leading, is placed on the upper portion of stripper plate 89 (see Figure 3), and slid upwardly along the stripper plate, until the leading edge touches the surface of the record carrier 15 between flange 135 at the right hand end and fingers 136 at the left end. The record support is now rotated manually by a knob (not shown) on shaft 16 until pins 134 enter the apertures in the sheet at which time the sheet may be released by the hand and rotation of record support continued either manually or by the drive motor 23 upon energization of solenoid 45 to wrap the sheet around the carrier 15.

As the support is rotated, the sheet advances into the nip between fixed guide members 137 and the record carrier surface, and also into the nip between that surface and traversing guide 138, which is mounted on carriage 56. Fixed guides 137, which are adjacent the ends of the record carrier 15, conduct the leading edge of the sheet and the following portions into conformity with the surface of carrier 15. As the rotation continues the finger following the pin 134 and shown in Figure 3 as **136*a* engages the underside of the left hand edge of the sheet, holding the sheet in that region somewhat away from the surface of the carrier 15. However, as this position of engagement moves into the area wherein fixed guide 137 is closer to the surface of carrier 15, the edge of the sheet is forced down along the angled surface 139 of finger 136*a*, setting up a compression force in the sheet. Responsive to that force, the sheet shifts to the right as seen in Figure 5 until the right hand edge abuts against flange 135. When rightward movement of the sheet is limited by such engagement, the remaining force is dissipated by urging the finger 136*a* to the left, as viewed in Figure 5, it being noted that the finger 136 is only secured to carrier 15 toward its lower end, so that it is free to bend. As the rotation continues each succeeding finger 136 reacts in the same way, so that when an entire revolution of the carrier 15 has been completed, the record sheet is wrapped around the carrier and throughout its circumference is yieldingly held against flange 135 by the four fingers 136**.

The fingers 136 and their application to machines of this kind are disclosed and claimed in co-pending application of Lloyd J. Bobb, Serial No. 408,198, filed February 4, 1954.

The record may now be recorded upon, or intelligence thereon may be reproduced, by energizing solenoid 45, thus causing rotation of carrier 15 and translational movement of carriage 56 with heads 61 and 62 in scanning engagement therewith, so that the heads scan a helical path repeatedly crossing from the trailing edge to the leading portion of the record.

During this process, the fixed guides 137 maintain the trailing edge in fairly close contact with the carrier surface throughout the circumference of carrier 15, except for the space between the point 137*a* and the point 137*b*, which space is necessary to accommodate loading and unloading of the sheet.

Traversing guide 138 also extends along the surface of carrier 15 in the region engaged by heads 61 and 62. This guide is mounted on channel member 84 and extends from a little below the center of carrier 15 in the rear to the loading space in the upper quadrant in front.

To unload the machine, it is necessary only to reversely rotate the carrier manually as by a knob (not shown) on shaft 16. When, in such rotation, the trailing edge is released by upper fixed guide element 137*a*, it straightens out slightly due to its inherent stiffness and may be caught and stripped by stripper plate 89. Stripper 89, as will be seen in Figure 3, is mounted on member 87 by means of screws 140 which are shouldered as at 141 and on which are mounted rubber grommets 142. This arrangement permits stripper plate to be oscillated slightly about an axis passing through the two screws 140, so that the stripper edge 143 may be depressed and brought into intimate contact with a record on carrier 15. It will further be noted from Figure 1 that the edge 143 of stripper 89 is arcuate or pointed, i.e., that it is cut back toward the sides so as to engage the trailing edge of a record at its center before the trailing edge is engaged by the outer portions of the stripper. This arrangement provides for positive stripper action even when the trailing edge conforms very closely to the cylindrical record support and despite the presence of the guides 137 at the ends of the carrier.

It should here be pointed out that both the fixed guides 137 and the traversing guide 138 contribute to the simplicity of the unloading operation. In the absence of these guides, forward rotation of the carrier with a record loaded thereon would be perfectly feasible, since the outermost of the overlapped edges under that condition is in trailing position. However, when the support 15 is rotated in the reverse direction, the outermost overlapping edge is in leading position and will catch on other parts of the machine if not kept fairly close to the surface of carrier 15. The fixed guides 137 perform this function insofar as fouling on fixed portions of the machine are concerned, but inasmuch as the scanning heads and carriage assembly—even in their disengaged condition—are relatively close to the carrier surface, it would be possible for the trailing edge to pile up on the carriage or heads when the latter are located in the middle portion, axially speaking, of their translational path. The traversing guide 138 guides the outermost overlapped edge past the heads and carriage assembly during reverse rotation, only releasing the edge when it reaches the loading and unloading space in the upper front quadrant of carrier 15.

From the foregoing it will be seen that the drives and drive control mechanism of the invention is simple and easily adjustable; that the back spacing and switching functions are controlled in an improved and simplified way; and that the mechanism provides for simplified loading and unloading of records.

I claim:

1. A machine adapted for use with flexible sheet type records, comprising a record carrier having an endless record supporting surface about which a sheet record is adapted to be wrapped with one edge overlapping the other, controllable mechanism for driving said record carrier in one direction to advance the record supported thereon in a direction in which the overlapping edge is in trailing position, said carrier also being reversely movable, and a record stripper device having an elongated stripper edge extended adjacent and along the record carrier from a point near one end thereof to a point near the other end thereof, the ends of said stripper edge being cut back to engage the overlapping edge of a record, upon reverse movement of the carrier, after engagement of the intermediate portion of the stripper edge under the intermediate portion of the overlapping edge of a record.

2. A construction according to claim 1 in which the stripper edge is yieldingly mounted in spaced relation to the record carrier but manually displaceable to bring the stripper edge into engagement with a record on the carrier.

3. A machine adapted for use with flexible sheet type records, comprising a rotatable record support about which a sheet record is adapted to be wrapped with one edge overlapping the other, controllable mechanism for driving the support in a direction in which the overlapping edge of the record is in trailing position, said record support also being reversely rotatable, guides for retaining the record wrapped about the record support and including guide devices respectively located in planes adjacent the ends of the record support and extending adjacent the circumference of the support but interrupted toward one side of the machine to provide for generally tangential delivery of a sheet record to the support and generally tangential removal of a sheet therefrom, and a stripper device having a stripper edge positioned adjacent the support, the stripper edge being movable into and out of engagement with a record on the support in the region of said interruption to provide for engagement of the stripper edge under the overlapping edge of a sheet record on the support upon reverse rotation thereof.

4. A machine adapted for use with flexible sheet type records, comprising a rotatable record support about which a sheet record is adapted to be wrapped with one edge overlapping the other, controllable mechanism for driving the support in a direction in which the overlapping edge of the record is in trailing position, said record support also being reversely rotatable, guides for retaining the record wrapped about the record support and including guide devices respectively located in planes adjacent the ends of the record support and extending adjacent the circumference of the support but interrupted toward one side of the machine to provide for generally tangential delivery of a sheet record to the support and generally tangential removal of a sheet therefrom, and a stripper device having a stripper edge positioned adjacent the support, the ends of said stripper edge being cut back to engage, upon reverse rotation of the support, the overlapping edge of the record near the planes of said guide devices after the intermediate portion of the stripper edge engages under a portion of the overlapping edge of the record remote from said planes.

5. Record-reproducing apparatus of the kind in which a sheet record is wrapped around a revolvable carrier during scanning, comprising a revolvable record carrier, a carriage-way extending along the carrier in a direction normal to the direction of the carrier revolution, a carriage adapted to traverse the carriage-way, a scanning head mounted on the carriage and adapted to engage and scan a record on the carrier during revolution thereof, and a record guiding element mounted on the carriage for movement therewith along the carriage-way and having a surface confronting the surface of said carrier and extending in the direction of revolution, from a point close to the carrier surface in the region engaged by the scanning head to a point more removed from the carrier surface and displaced from said region.

6. Apparatus in accordance with claim 5 in which said guide element extends along the surface of the carrier in a radial plane close to but displaced from the radial plane of engagement between the head and a record on the support, and further including a second record guiding element extending along the surface of the carrier in a second plane close to said plane of engagement, but displaced therefrom in a direction opposite to the displacement of said first guide element.

7. Apparatus in accordance with claim 6 in which the head is mounted on the carriage with freedom for movement relative thereto toward and away from a position of scanning engagement with a record on the carrier, and in which one of said guide elements is mounted on the carriage for movement toward and away from the carrier conjointly with the head and the other guide element is maintained at a fixed distance from the surface of the carrier despite said movement of the head and first element.

8. Apparatus in accordance with claim 5 in which the head is mounted on the carriage with freedom for movement relative thereto toward and away from a position of scanning engagement with a record on the carrier, and said record guiding element is mounted on the carriage in a manner establishing the relationship between the guide element and the surface of the carrier independently of said relative movement of the head.

9. Apparatus in accordance with claim 5 in which the head is mounted on the carriage with freedom for movement relative thereto toward and away from a position of scanning engagement with a record on the carrier and in which said record guiding element is mounted for movement relative to the carriage conjointly with the head.

10. Apparatus in accordance with claim 5 in which said guiding element is adjacent said surface in a region about to be scanned by the head.

11. Recording-reproducing apparatus of the kind in which a record-sheet is scanned while wrapped around a revolvable carrier with one edge free for movement radially of the carrier, comprising a revolvable record carrier, a guide way extending along the carrier in a direction normal to the direction of carrier revolution, a scanning head traversable on the guide way and adapted to engage and scan a record-sheet on the carrier during revolution of the carrier and traverse of the head, a record-sheet guiding element mounted with the head for movement along the guide way and extending along and adjacent the surface of the carrier in close proximity thereto in the region engaged by the scanning head to conduct said free edge between the carrier surface and the scanning head and to release said free edge after it has passed said head, and a stripper device yieldingly mounted in spaced relation to the carrier in the region of release of said free edge and manually displaceable to bring the stripper edge into engagement with said free edge and conduct the record-sheet away from the carrier surface.

References Cited in the file of this patent

UNITED STATES PATENTS

| | | |
|---|---|---|
| 2,279,227 | Dunning et al. | Apr. 7, 1942 |
| 2,284,836 | Norton et al. | June 2, 1942 |
| 2,380,754 | Hardy | July 31, 1945 |
| 2,435,260 | Wise et al. | Feb. 3, 1948 |
| 2,535,480 | Begun | Dec. 26, 1950 |
| 2,581,499 | Roberts | Jan. 8, 1952 |
| 2,645,494 | Keller | July 14, 1953 |
| 2,646,335 | Wise et al. | July 21, 1933 |
| 2,653,819 | Roberts | Sept. 19, 1953 |
| 2,745,904 | Bobb | May 15, 1956 |

FOREIGN PATENTS

| | | |
|---|---|---|
| 638,288 | Great Britain | June 7, 1950 |